United States Patent [19]
Davenport

[11] 3,847,294
[45] Nov. 12, 1974

[54] DUAL WHEEL REMOVER
[76] Inventor: Gordon Leroy Davenport, 1424 5th St., Greeley, Colo. 80631
[22] Filed: Mar. 9, 1973
[21] Appl. No.: 339,523

[52] U.S. Cl. .............................. 214/332, 254/8 C
[51] Int. Cl. ........................................... B60b 29/00
[58] Field of Search .......... 214/330, 331, 332, 333, 214/334, 130 R, 131 R; 254/8 R, 8 C, 126

[56] References Cited
UNITED STATES PATENTS
| | | | |
|---|---|---|---|
| 1,399,351 | 12/1921 | Lee | 214/332 |
| 2,410,902 | 11/1946 | Roberts | 214/332 |
| 2,490,233 | 12/1949 | Schildmeier | 214/331 |
| 2,543,276 | 2/1951 | Buechler | 214/332 |
| 2,640,604 | 6/1953 | Curley | 214/332 |

FOREIGN PATENTS OR APPLICATIONS
1,072,049   9/1954   France ............................... 214/332

Primary Examiner—Robert J. Spar
Assistant Examiner—Lawrence J. Oresky

[57] ABSTRACT

A device which aids in safe, efficient removal of heavy truck wheels for replacement or repair, is disclosed herein.

The dual wheel remover, which is mounted on a combination of fixed and swivel type casters, is easily positioned and moved by one individual, and with the tilting adjustable feature, allows the wheels to be easily removed from the vehicle and securely transported, without the necessity of the operator of the device to physically handle the wheel units.

5 Claims, 2 Drawing Figures

DUAL WHEEL REMOVER

BACKGROUND OF THE INVENTION

The present invention was developed to fulfill a need for the safe and efficient removal, mounting, and handling of large dual wheels, or heavy single wheel units which are common to heavy-duty trucks, and the device should provide a service especially desirable to large garages, truck terminals, and both private and municipal bus terminals.

OBJECTS OF THE PRESENT INVENTION

The primary object of the present invention is the safe and convenient handling of heavy truck wheels (especially dual type) when mounting or dismounting them from the vehicle involved.

Another object is the incorporation and function of the cradle assembly of the device, which serves to support the wheel assembly as it is being removed from the vehicle, and because of the tilting adjustment, forestalls and prevents any tipping motion of the wheel unit as it is transported for replacement or repair.

DETAILED DESCRIPTION

Figure 1:
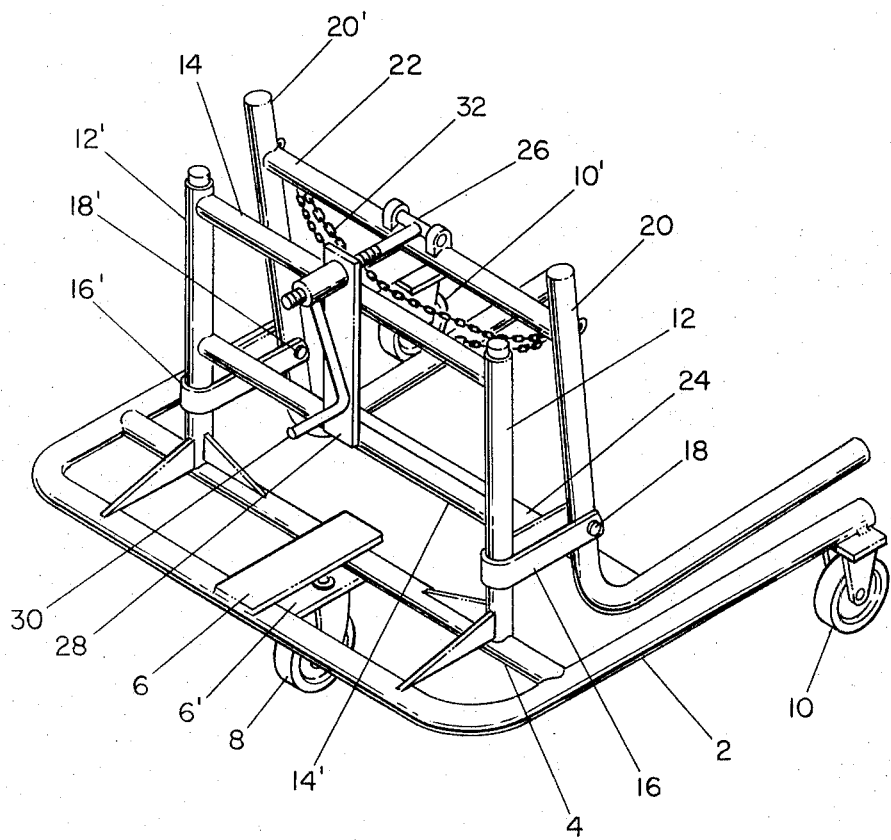
FIG. 1 is a three-dimensional drawing of the assembled device.

The assembled device, as illustrated in FIG. 1, is fabricated in accordance with the design and concepts of the present invention, and is identified by the component breakdown as follows;

The base assembly consists of a length of metal tubing (Reference numeral 2) which is bent into a U-shape, and reinforced with a cross-member of similar material (Reference numeral 4). Two metal plates 6 and 6' are placed above and below the base assembly tubing, the lower 6' serving as a mounting for the pivot caster 8 which provides steering of the device. Forward rolling support is provided by the two fixed casters 10 and 10' which are attached to the underside of the base assembly tubing 2.

Two uprights 12 and 12' are affixed to the base cross-member 4 and braced with upper and lower cross-braces 14 and 14' and provide a mounting support for the cradle assembly, which is secured to the brackets 16 and 16' by bolts 18 and 18' and is composed of two right-angled arms 20 and 20', an upper cross-piece 22, and a lower cross-piece 24.

The adjustment mechanism consists of a threaded T-stud 26 attached to the upper cross-piece 22 and extending thru the upright bearing plate 28, and having a hand-crank 30 attached to the opposite threaded end.

Figure 2:
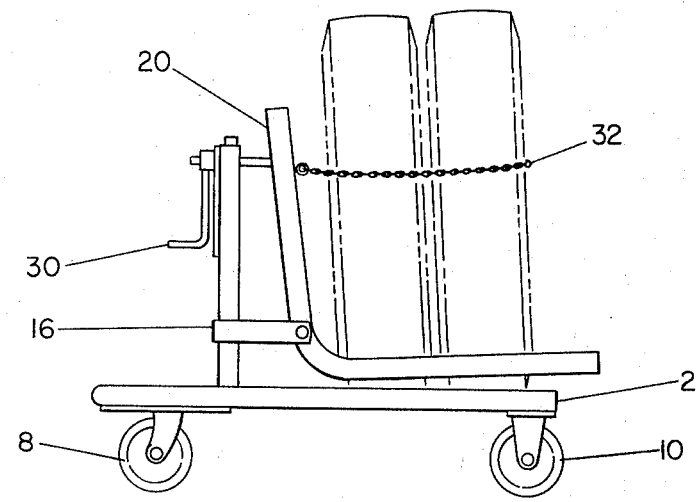
FIG. 2 is an orthographic side view of the device, showing the manner in which the wheel units are secured.

A length of chain 32 is connected to the cradle arms 20 and 20' to provide a means of securing the wheel unit in transit, as shown in FIG. 2. Note: All tubing should be sufficiently heavy to furnish adequate load support, with all metal components welded, except where otherwise indicated.

What is claimed for the present invention is:

1. A wheel and tire handling device intended for use when mounting or dismounting dual type wheel units from trucks and the like as well as for use in the transportation of such wheel units between different locations, the device comprising a base frame member of a generally U-shaped configuration having a bight portion forming a back surface thereof and having spaced apart forwardly extending leg portions adapted to straddle the lower portion of the wheels to be handled thereby in a transverse manner with respect to the plane of such wheels, a fixed caster wheel mounted to the lower surface of each front end of each leg portion to support the same on a suitable work surface, a pivot caster associated with the bight portion approximately centrally thereof and pivotable about an axis extending normal to the plane of the base frame member for use in steering the device, a pair of upright vertically extending transversely spaced apart post members, each post member associated with one of said leg portions, a transversely extending reinforcing member interconnecting the top portions of said post members, a bracket mounted on each of said post members adjacent the bottom ends thereof and extending in a direction forwardly thereof substantially parallel to the associated leg portions, a cradle comprised of a pair of generally L-shaped transversely spaced apart vertically disposed arm members each having a generally vertical segment and a generally horizontal segment and each interconnected by transversely extending upper and lower cross-piece members, said upper cross-piece member interconnecting said arms adjacent the top end portions of said vertical segments with said lower cross-piece member interconnecting said arms adjacent the point of connection of said horizontal segments to said vertical segments, said horizontal segments projecting forwardly of said base in the direction of said leg portions of said base, said vertical segments each being pivotally connected to an associated one of said brackets by a pivot bolt extending therethrough at a position substantially adjacent the point of connection to said horizontal segment thus providing for rocking pivotal movement of said cradle about said pivot bolts relative to said base frame, and screw thread adjustment means interconnecting said upper cross-piece member of said cradle to said reinforcement brace extending transversely between said upright post members and operable to selectively control the pivoting movement of said cradle whereby said horizontal segments are moved between an elevated and a lowered position for engaging and disengaging from wheels carried thereon.

2. The device as set forth in claim 1 wherein said adjustment means comprises a pair of upright vertically extending transversely spaced apart brackets affixed about the central point of said upper cross-piece member of said cradle, a plate member affixed to said cross-brace of said base frame, an aperture extending through said plate member in substantial horizontal alignment with central portions of said flange members, each of said flange members having an aperture extending transversely therethrough in axial alignment with each other, a T-shaped stud member having a pair of longitudinally aligned arm members and a centrally connected and outwardly extending leg portion disposed normal to said arm members, said arm members each associated with one of said flange members and pivotally mounted in the opening thereof, said leg member being threaded over a substantial portion thereof and extending through said aperture in said plate member, a hollow open ended interiorly threaded sleeve member threadedly received on said leg member in engagement with said plate member, a crank having one end affixed to said sleeve member and a body member extending radially outwardly from said sleeve member and terminating in a handle portion extending at right-angles to said body member and substantially parallel to the axis of said sleeve member, the rotation of said crank in a first direction effecting the threading of said sleeve member onto said leg member which bears against said plate member and thus draws said upper cross-piece member closer to said cross-brace member to effect the pivoting of said cradle in a direction to elevate the horizontal segments, and rotation of said crank in the opposite direction unthreads said leg member from said sleeve to thus increase the distance between said upper cross-piece member and said cross-brace member to pivot said cradle in a manner to lower said horizontal segment.

3. The device as set forth in claim 2 further characterized by a transversely extending reinforcement member extending between said leg portions and spaced a short distance from said bight portion of said base frame member, said upright post members each having one end affixed to said reinforcement member, a longitudinally extending plate member interconnecting the approximate central portions of said bight member to said reinforcement member, and said pivoting caster wheel being permanently affixed to said plate and extending downwardly therefrom to support said base frame member.

4. The device as set forth in claim 3 further characterized by an elongated flexible chain member adapted to be deployed in an approximate U-shaped configuration having a bight portion disposed forwardly of said base frame member and having each opposed leg portion terminating at an associated vertical segment of said arm of said cradle adjacent a top end thereof, said chain adapted to pass about a dual wheel unit when resting on said horizontal segments of said cradle to retain said dual wheel unit in position thereon.

5. The device as set forth in claim 4 wherein said base frame members, said upright post members, said cradle members, said cross-brace member, and said cross-piece member are each fabricated of tubular steel bent to the desired configuration and welded together at points of interconnection.

* * * * *